Oct. 14, 1941.    R. D. DE FOREST    2,259,365
WHEEL JACK
Filed Oct. 29, 1940    2 Sheets-Sheet 2

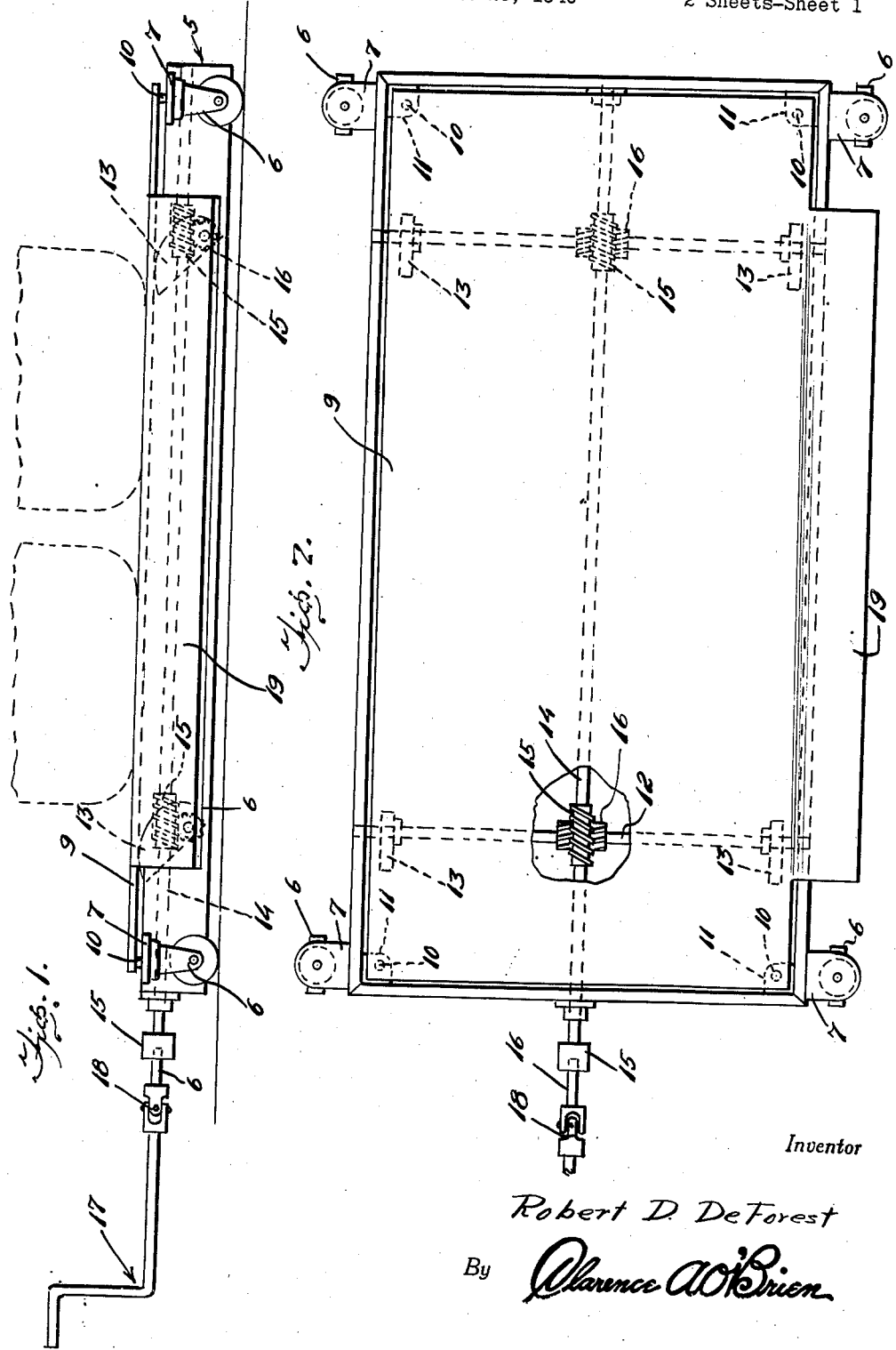

Inventor
Robert D. DeForest

By Clarence A. O'Brien

Attorney

Patented Oct. 14, 1941

2,259,365

UNITED STATES PATENT OFFICE 2,259,365

WHEEL JACK

Robert D. De Forest, Phalanx Station, Ohio, assignor of one-half to Charles E. Anderson, Warren, Ohio Application October 29, 1940, Serial No. 363,370

1 Claim. (Cl. 254—2)

This invention relates to wheel jacks, and an object of the invention is to provide a jack to facilitate the handling of large vehicle wheels such as dual wheels used on motor trucks, buses, trailers, and similar vehicles, and which wheels cannot be readily handled manually.

Further an object of the invention is to provide a jack which will render possible the removal of a dual wheel, its hub and brake drum as a unit and without damage to the grease retainer, axle threads, or brake shoes. In this connection it may be observed that mechanics find it difficult to so handle dual wheels without resulting damage to the elements just mentioned and consequently the present practice is to take apart a dual wheel when mounting or demounting the same in order to avoid damage to the grease retainer therefor, the threads of the axle on which it is mounted, and the brake shoes forming part of the wheel brake and which is usually associated with such form of wheel.

The invention together with its objects and advantages will be best understood from a study of the following description taken in connection with the accompanying drawings wherein:

Figure 1 is a side elevational view of a jack embodying the features of the present invention.

Figure 2 is a top plan view thereof with certain parts broken away to illustrate certain details hereinafter more fully referred to.

Figure 3:
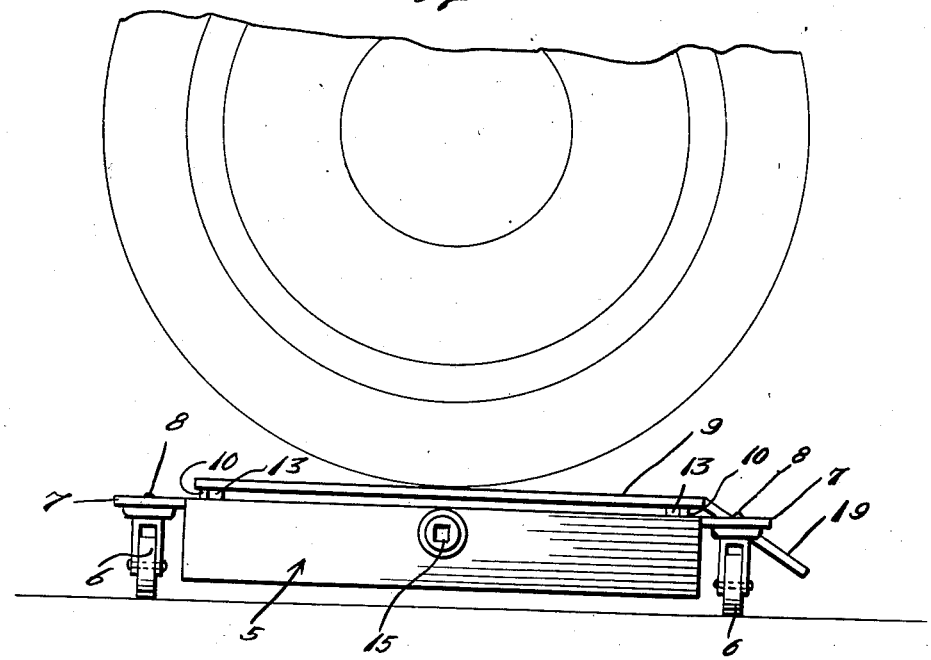
Figure 3 is a front end elevational view of the jack further illustrating the use of the same.
Figure 4:
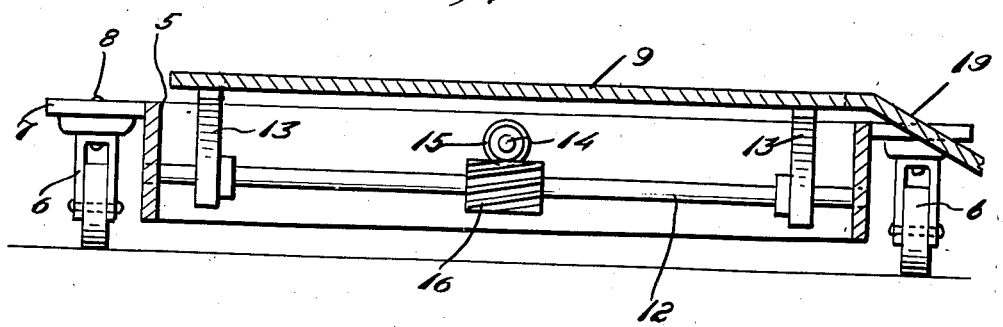
Figure 4 is a transverse sectional view through the jack.
Figure 5:
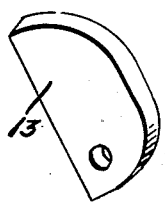
Figure 5 is a perspective view of a cam member forming part of the invention.

Referring more in detail to the drawings it will be seen that in the preferred embodiment thereof the jack comprises a rectangular frame 5 mounted on casters 6.

The casters 6 are disposed at the corners of the frame 5, and at said corners the frame 5 has laterally projecting ears 7 to which the casters 6 are swivelly connected as indicated generally at 8.

Further the jack embodies a work supporting platform 9 that is mounted for vertical up-and-down movement relative to the frame 5 and is guided in said movement through the medium of guide pins 10 disposed at the corners of the platform 9 and working through apertured guide lugs 11 provided therefor at the corners of the frame 5. As will be seen from Figure 2 the platform 9 is of less width and length than the interior dimension of the frame.

For raising and lowering the platform 9 shafts 12 are journaled transversely of the frame 5 and are equipped with cams 13 that engage the underside of the platform 9 as shown so that as the shafts 12 are rotated in one direction the cams 13 act to raise the platform 9 and when the shafts 12 are rotated in a reverse direction, the cams 13 turning therewith permit the platform 9 to lower.

For operating the shafts 12 there is provided an operating shaft 14 that is journaled longitudinally of the frame 5 as shown and is provided with worms 15 that are in constant mesh with worm wheels 16 on the shafts 12.

At one end thereof the operating shaft 14 is provided with a socket 15 to receive one end 16 of a crank handle 17.

The handle 17 is provided with a universal joint 18 to facilitate manipulation of the handle and consequent rotation of the shaft 14 for effecting, through the medium of the shaft 14, gearing 15, 16, shafts 12 and cams 13 the raising and lowering of the platform 9.

Also the platform 9, which may be formed from a sheet of metal or any other suitable material, is provided at one longitudinal edge thereof with a lateral and downwardly extending extension 19 that functions as a ramp and, as is believed to be apparent, facilitates the rolling of the vehicle wheel onto or off of the platform 9.

It will be apparent that in using the jack for mounting heavy wheels, such as dual vehicle wheels, the platform 9 is lowered so that such wheel may be rolled onto the platform from the ramp side 19 thereof. The wheel on the platform 9 may then be elevated to align the hub thereof with the vehicle axle by proper manipulation of the crank 17 for rotating the shaft 14 in the proper direction.

It will thus be seen that a jack embodying the features of the present invention makes possible quicker, easier and safer handling of heavy wheels, and can be easily operated by a single person.

It is thought that the simplicity, ease of operation, and advantages of a jack of this character will be had by those skilled in the art without a more detailed description thereof.

Having thus described the invention what is claimed as new is:

In a jack of the character described, a rectangular open-work frame, outwardly extending ears at the ends of the side members of the frame, caster wheels swivelled to the ears and extending below the lower edge of the frame, a platform supported for vertical movement in the frame, means for raising and lowering the platform and said platform having a ramp forming part sloping downwardly and outwardly from one side edge thereof, said ramp forming part being shorter than the length of the platform and extending between a pair of the ears.

ROBERT D. DE FOREST.